July 24, 1934. E. F. LAY ET AL 1,967,443
BUTTER MELTING AND SPREADING DEVICE
Filed Sept. 8, 1933 2 Sheets-Sheet 1

Inventors
E. F. Lay
C. W. Shirley
By *Clarence A. O'Brien*
Attorney

July 24, 1934.  E. F. LAY ET AL  1,967,443
BUTTER MELTING AND SPREADING DEVICE
Filed Sept. 8, 1933  2 Sheets-Sheet 2
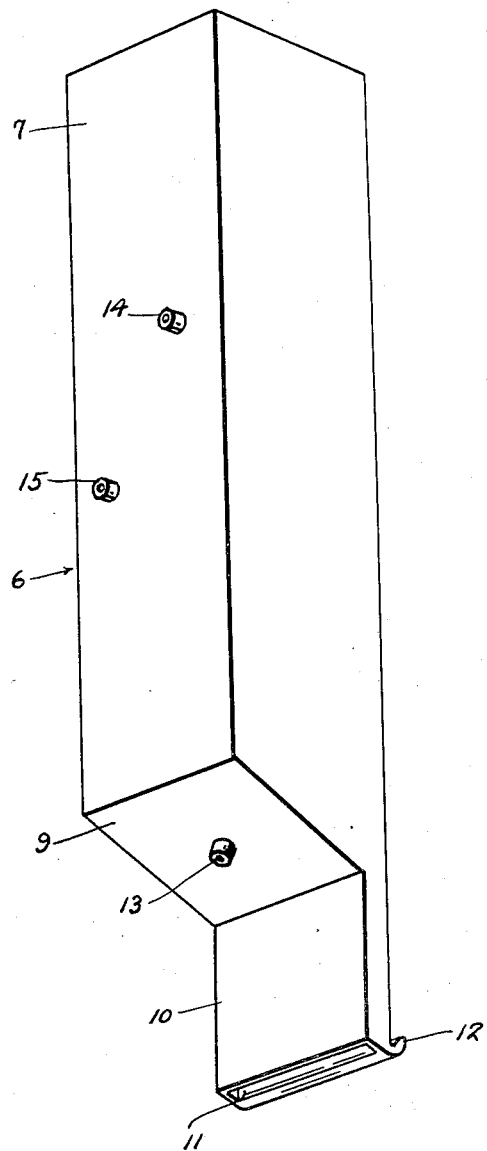
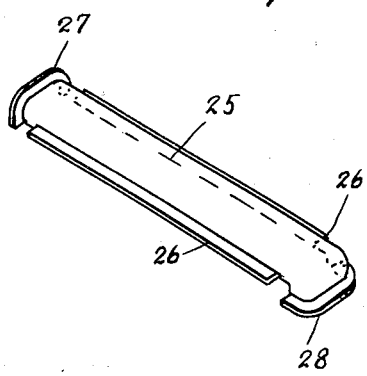
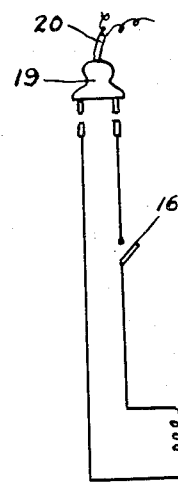
Inventors
E. F. Lay
C. W. Shirley
By Clarence A. O'Brien
Attorney Patented July 24, 1934

UNITED STATES PATENT OFFICE 1,967,443

BUTTER MELTING AND SPREADING DEVICE

Egbert F. Lay, Austin, and Charles W. Shirley, Houston, Tex., assignors of one-fifth to Cecil G. Shirley, Houston, Tex.

Application September 8, 1933, Serial No. 688,684

2 Claims. (Cl. 91—43)

This invention relates to an improved device which may be classified as an electrical appliance and which is expressly designed and constructed for the purpose of containing, melting and spreading butter.

Various makeshift methods and practices are in vogue in restaurants and the like in buttering bread, particularly in the making of sandwiches. As a general rule that butter is melted in a pan or similar receptacle and is quickly spread on the surface of the bread with a bristle brush or the like. Where speed is required in preparation of sandwiches some such expeditious methods must be resorted to. It is thought, however, that the aforesaid method is not only crude and unsanitary but is disagreeable and unsightly.

We have therefore discovered the need for the provision of a simple and economical electrical appliance which will permit the desired results to be obtained in a more satisfactory and practicable manner. This result is accomplished through the instrumentality of an electric heater equipped container having a distributing nozzle and a spreading blade so as to permit the butter to be freshly melted and applied only when needed.

The preferred embodiment of the invention which we have found to be satisfactory for the purpose will become more readily apparent from the following description and drawings.

In the drawings:

Figure 3 is a perspective view of the butter container and spreader unit with certain of the other accessories removed for clearness of illustration.

Figure 4 is a perspective view of the electric cord shield.

Figure 5 is a diagrammatic view showing the preferred method of wiring.

Figure 1:
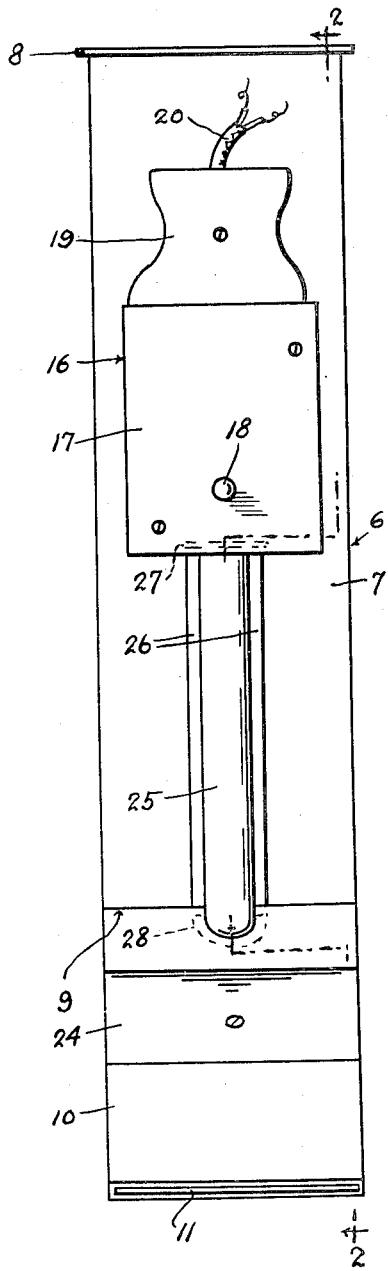
Figure 1 is an elevational view illustrating certain primary features of the invention developed in accordance with our idea.
Figure 2:
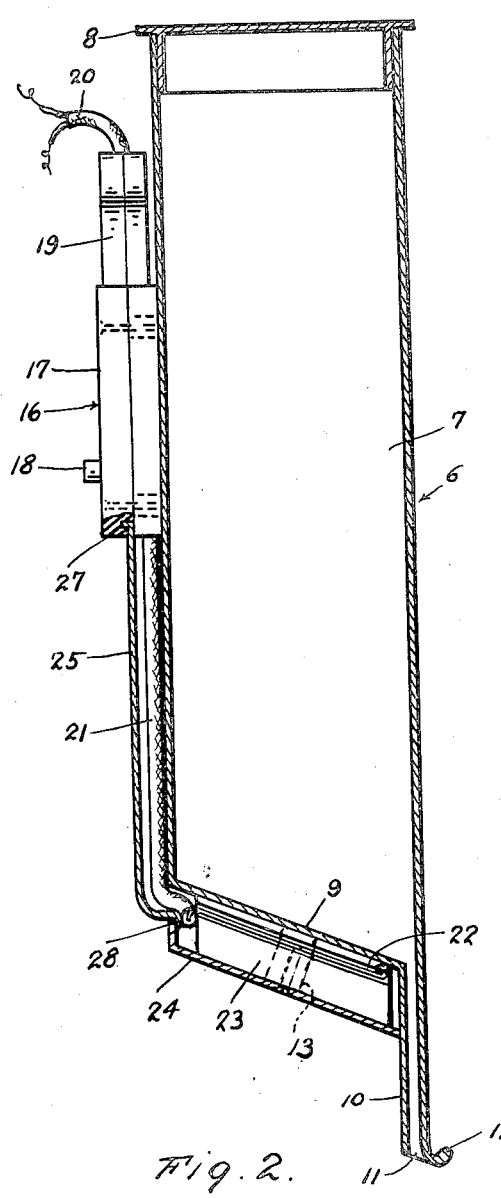
Figure 2 is a sectional end elevational view at right angles thereto, the section being taken approximately on the plane of the line 2—2 of Figure 1.

Attention is first called to the numeral 6 in Figure 3 which denotes the principal containing, distributing and spreading unit. This comprises a vertically elongated box like container 7 of any appropriate proportion, shape and material. It is here shown as of general rectangular form to accommodate the customary one-quarter pound portion or block of butter. It is open at its top to accommodate a removable lid or cover 8 as shown in Figure 2. The bottom 9 is inclined to permit the melted butter to gravitate and discharge into the distributing nozzle 10. The discharge slot in this is differentiated by the numeral 11 and the numeral 12 designates the curved spreading blade or "brush". The numerals 13, 14 and 15 are merely screw threaded bosses to accommodate certain other parts to be hereinafter described.

I first call attention to the manually controllable switch unit 16 which is removably supported on the back wall of the container by screws passing through the unit into the bosses 14 and 15. This comprises a suitably casing 17 with a switch mechanism, (not shown) located therein. The switch is actuated through the medium of a presser button 18. The unit 16 is of course constructed to accommodate a prong equipped plug 19 to which the current supply cable or cord 20 is connected. The cable 20 is provided at its opposite end with a suitable fixture (not shown) to be attached to a wall or floor plug, socket or the like. In Figure 2 the numeral 21 designates a current conductor which extends down and is attached to a heating coil or element 22 mounted on a supporting block or core 23. This is held against the inclined bottom 9 by way of a removable pan or tray 24 which is held in place by a screw passing through the pan into the boss 13. The numeral 25 designates a suitably shaped shield having longitudinal abutment flanges 26 on opposite edges and provided at opposite ends with retention flanges 27 and 28, the flange 27 being engaged with the switch casing as shown in Figure 2 and the other flange engaged with the tray 24 as shown in the same figure. This part 25 merely covers or shields and protects the current conductor 21. The heating unit comprising the core 23 and heating element 22 being held in the tray 24 is easily accessible and renewable.

In practice the block or portion of butter is placed in through the open top of the receptacle or container 7 and the lid 8 is put in position. By closing the switch 16, which is accomplished by pressing the button 18, the electrical heating element 22 is brought into play. This heats the bottom 9 which in turn heats the butter and melts a predetermined quantity thereof. The melted butter flows in a film down through the discharge and distributing nozzle 10 onto the bread or other receptive article (not shown). The butter can be spread with a knife or the spreading blade 12 can be utilized in a practical manner for accomplishing this result. When the device is not in use the plug 19 can be detached and the device as a unit can be placed in the ice box to keep the butter in good condition.

The gist of the invention is found in the provision of a suitably proportioned and shaped container for butter which has an inclined bottom to facilitate gravitation of the melted butter into a discharge spout, the spout being equipped with a spreading blade. The heating means may be of any appropriate type but is preferably of the form described and illustrated in the drawings. The protective shield 25, the wiring and switch arrangement may be varied as circumstances state.

An appliance of this type when constructed in accordance with principles illustrated will be found to be mechanically correct, systematically balanced and sensitive in operation. The melting operation can be brought into play or cut out by a simple operation of the control switch. Being light in weight and easy to handle one soon learns to operate and utilize the appliance with expediency and skill. So dependable are these results that the device has proved to be a revelation in this particular line of endeavor and because of the ingenous properties which it includes it serves as a practical innovation promoting sanitation and serving to fulfill the desired results in a highly satisfactory and practical manner.

Particularly do we wish to emphasize the provision of a butter container of appropriate proportion and shape having a "hot plate" 9 preferably inclined to expeditiously dispense the melted butter into the discharge passage so that it may be effectively applied and spread. Then too novelty is thought to reside in the provision of suitable heating means for the hot plate which is under the control of the user so as to permit a quantity of the melted butter to be regulated according to demand.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

Having thus described our invention, what we claim as new is:

1. A structure of the class described comprising a butter container open at one end, a closure for said open end, the opposite end of said container being provided with an inclined butter supporting and melting plate, being further provided with a substantially flat tubular distributing nozzle, said nozzle being provided with a spreading blade, a tray detachably connected with the inclined end of the container, an electrical heating element in said tray, a manually regulated switch, and a current connection between the switch and electrical heating element.

2. A butter melting and spreading device comprising an elongated rectangular casing composed of front, rear and side walls, said casing being open at its upper end and having a bottom part which slopes downwardly from the rear wall to a point spaced from the front wall, the front portions of the side walls and the lower end of the front wall being extended to form the front sides of a nozzle, the upper end of which is in communication with said space, a rear wall for the nozzle having its upper end connected with the front end of the sloping bottom, the lower end of the front wall of the nozzle being bent forwardly and upwardly to provide a spreading blade, a heating member located on the lower face of the bottom part of the casing, and a small casing enclosing the heating member and having its front part closed by the upper portion of the rear wall of the nozzle.

EGBERT F. LAY.
CHARLES W. SHIRLEY.